United States Patent [19]

Wakabayashi

[11] Patent Number: 4,597,657

[45] Date of Patent: Jul. 1, 1986

[54] COMPACT CAMERA CAPABLE OF ENCASING A PHOTOTAKING OPTICAL SYSTEM

[75] Inventor: Hiroshi Wakabayashi, Yokohama, Japan

[73] Assignee: Nippon Kogaku K. K., Tokyo, Japan

[21] Appl. No.: 658,509

[22] Filed: Oct. 9, 1984

[30] Foreign Application Priority Data

Oct. 17, 1983 [JP] Japan ................................ 58-193996
Oct. 26, 1983 [JP] Japan ................................ 58-200614

[51] Int. Cl.⁴ .......................... G03B 3/10; G03S 17/04
[52] U.S. Cl. ........................ 354/195.12; 354/187; 354/195.1

[58] Field of Search ............... 354/195.1, 195.12, 288, 354/266, 187

[56] References Cited

U.S. PATENT DOCUMENTS 3,913,113 10/1975 Yamashita ......................... 354/195.1
4,363,546 12/1982 Enomoto et al. ................. 354/195.1
4,410,253 10/1983 Tsuboi .............................. 354/195.1

*Primary Examiner*—Michael L. Gellner
*Attorney, Agent, or Firm*—Shapiro and Shapiro

[57] ABSTRACT

A camera is provided with a phototaking optical system whose optical property can be changed, means for disabling the camera from taking a picture using the optical system, and a manual operating member for changeover.

14 Claims, 17 Drawing Figures

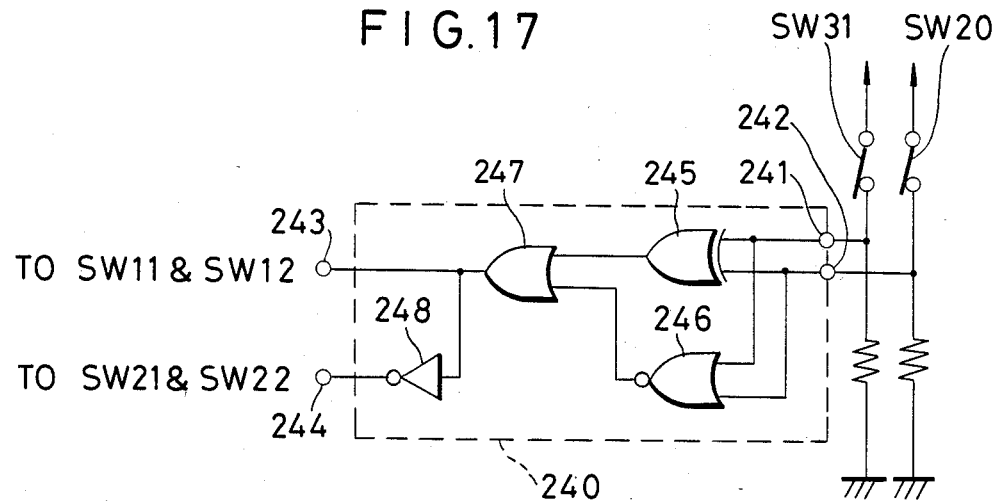

COMPACT CAMERA CAPABLE OF ENCASING A PHOTOTAKING OPTICAL SYSTEM

BACKGROUND OF THE INVENTION

1. Field of the Invention

The present invention relates to a compact camera. More particularly the present invention is directed to automation and simplification of various operations necessary for taking photographs by such a camera.

2. Description of the Prior Art

In the art there are known many compact cameras of the type in which the optical function of the optical system can be changed over from one to another without the need of exchanging the phototaking optical system for another. For example, there is known such a camera whose focal length can be changed by moving the taking lens system along the optical axis or by incorporating a separate optical system into the lens system mounted. Also, such a camera is known which enables macro-photography by shifting the lens system.

It is also known to keep the camera disabled from taking a picture when the camera is left unused. For example, there is known such a camera provided with a dust cover and/or means for prohibiting any unintentional shutter release. The taking optical system of the camera can be covered with the dust cover for purpose of protection. The prohibiting means prevents the shutter from being released unintentionally.

In the known camera provided with both of the above-mentioned functions, a user is required to carry out the following operations prior to exposure.

At first, prior to shutter releasing operation, the user changes over the state of the camera from the taking-disabled position to the taking-enabled position. Thereafter, the user changes the optical function of the phototaking optical system to a desired one. After completing the above operations, the user can release the shutter. Conventionally, two separate operation means have been provided for the above two operations. Therefore, the user has to shift the camera from one hand to the other between the two operations. It takes a long time before the start of an exposure. Because of this drawback, the user of such known cameras has often lost good photo opportunities.

SUMMARY OF THE INVENTION

Accordingly it is the general object of the invention to provide a compact camera in which the changeover of the optical function of a built-in phototaking optical system can be performed promptly with a very simple operation.

To attain the object, the camera according to the invention is provided with a taking optical system whose optical property can be changed, means for disabling the camera from taking a picture using the optical system and a manual operating member for changeover. In the camera, the changeover of the optical property as well as the actuation and cancellation of the disabling means are automatically controlled in conjunction with the changeover operation by the manual operating member.

In a preferred embodiment of the invention, the phototaking optical system is mounted movably in the direction of optical axis for the switchover of the focal length of the optical system. In conjunction with a switching motion of the manual operating member from a first position to a second position, the optical system is moved. The optical system is covered with a dust cover when the operating member is moved further from the second position to a third position.

Other and further objects, features and advantages of the invention will appear more fully from the following description taken in connection with the accompanying drawings.

BRIEF DESCRIPTION OF THE DRAWINGS

FIGS. 1 through 3 show a first embodiment of a camera according to the invention of which FIG. 1 is a plan view thereof with the lens being in the position adjusted to a telephoto range focal length, FIG. 2 is the same view with the lens being in the position adjusted to a wide angle range focal length and FIG. 3 is the same view with the lens being covered;

FIGS. 8 through 10 show a second embodiment of a camera according to the invention of which FIG. 8 is a plan view thereof with the lens being in the position adjusted to a telephoto range focal length, FIG. 9 is the same view with the lens being in the position adjusted to a wide angle range focal length and FIG. 10 is the same view with the lens being covered;

FIGS. 14 through 16 show a third embodiment of a camera according to the invention of which FIG. 14 is a plan view thereof with the lens being in the position adjusted to a telephoto range focal length, FIG. 15 is the same view with the lens being in the position adjusted to a wide angle range focal length and FIG. 16 is the same view with the lens being covered; and FIG. 17 is a circuit diagram showing the logic circuit for controlling the operation of the motor control apparatus.

DESCRIPTION OF PREFERRED EMBODIMENTS

A first embodiment of the present invention is shown in FIGS. 1 through 7.

The camera of this embodiment includes a taking optical system whose focal length is selectable from two different values, a dust cover and a shutter release prohibiting means.

Figure 1:
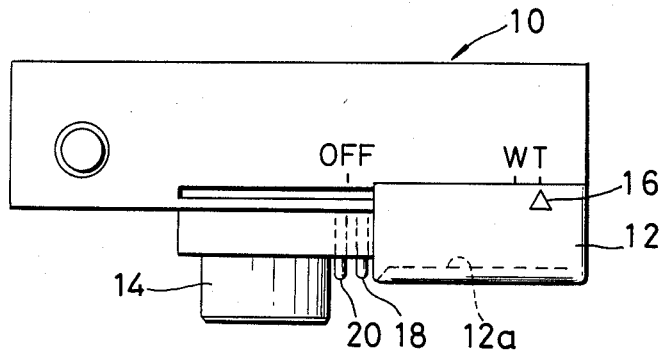
Figure 2:
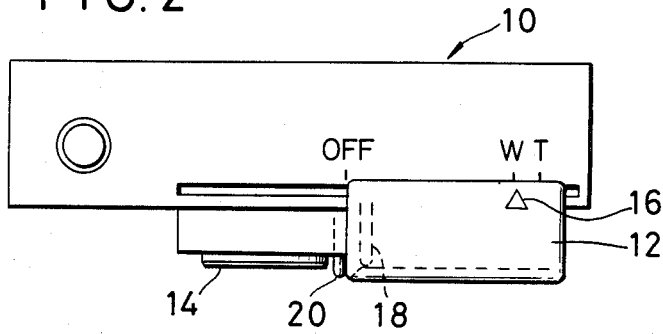
Figure 3:
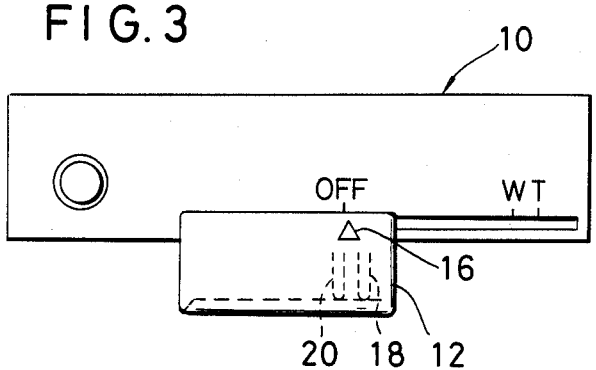

Referring first to FIGS. 1 to 3, the dust cover 12 of the camera 10 is slide movable in the direction across the optical axis of the taking lens 14 to open and close the lens 14. The dust cover 12 can be stopped at any selected one of three different positions, the first open position, the second open position and the close position by means of click stop. At the first and second positions of the dust cover 12, the taking lens 14 remains exposed to the atmosphere. At the close position, the dust cover covers the lens from the atmosphere. The taking lens 14 can be moved in the direction of optical axis to set it at one of two positions, the position drawn out forward and the position drawn in.

In FIG. 1, the cover 12 is shown to be at the first open position and the lens 14 is at the drawn-out position projected from the plane containing the front surface of the cover 12. In this position, as further described later, an auxiliary taking lens is brought into the phototaking optical path so that the taking lens 14 and the auxiliary lens form together a composite optical system having a focal length in the telephoto range. Therefore, in this position, the camera can be used for telephoto picture taking. A pointer 16 on the cover 12, in this position, points a mark "T" to indicate that the camera is now in the position adjusted to a telephoto focal length.

In FIG. 2, the cover 12 is shown to be at the second open position moved leftward from the first open position previously shown in FIG. 1. The lens 14 is at the position drawn into the camera housing from the position previously shown in FIG. 1. In this position shown in FIG. 2, the auxiliary lens is in a position retracted from the phototaking light path. The lens 14 has a focal length of the wide angle range (or the standard range). Therefore, the camera is in the position for wide angle picture taking. The pointer 16 points the mark "W" to indicate that the camera is now in the position adjusted to a wide angle focal length.

By further moving the cover 12 leftwards to the position shown in FIG. 3, the lens 14 in the drawn-in position is entirely covered by the dust cover 12. This position of the cover is referred to as the close position. In this position, the pointer 16 on the cover points the mark "OFF" on the housing to indicate that no picture-taking is possible.

In the vicinity of the taking lens 14 there are provided two slide pins 18 and 20. The pins are slidable axially and can be pushed back into the housing by the inner surface 12a of the cover 12. As seen from FIG. 4 the slide pins 18 and 20 are used to operate switches SW1, SW2 and SW3.

Figure 4:
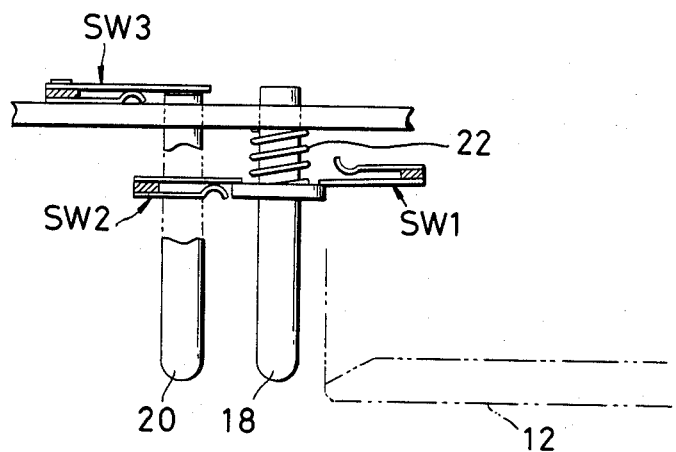
FIG. 4 is an enlarged view showing the arrangement of the switches in the first embodiment.

Referring to FIG. 4, the switches SW1 and SW2 are antiphase to each other so that when one of the switches SW1 and SW2 is closed by the slide pin 18, the other is opened. By this operation of the switches the rotational direction of a motor for moving the lens 14 is reversed. The pin 18 is under the biasing force of a spring 22 which tends to push the pin up. Consequently, so long as the cover 12 is in the first open position shown in FIG. 1, the top end of the pin 18 is protruding in the slide path of the inner surface 12a of the cover. In this position, the switch SW1 is opened and SW2 is closed. When the cover 12 is moved leftward as viewed in FIG. 4, the pin 18 is pushed down against the biasing force of the spring 22 by the inner surface of the cover so that the switch SW1 is closed and the switch SW2 is opened by the pin 18.

The switch SW3 is normally closed. It is opened by the slide pin 20 when the dust cover 12 is moved further leftwards from the second open position thereby pushing the pin 20 down. As will be described later, when the switch SW3 is opened, the power to a shutter control circuit is cut off to prohibit shutter release operation.

Figure 5:
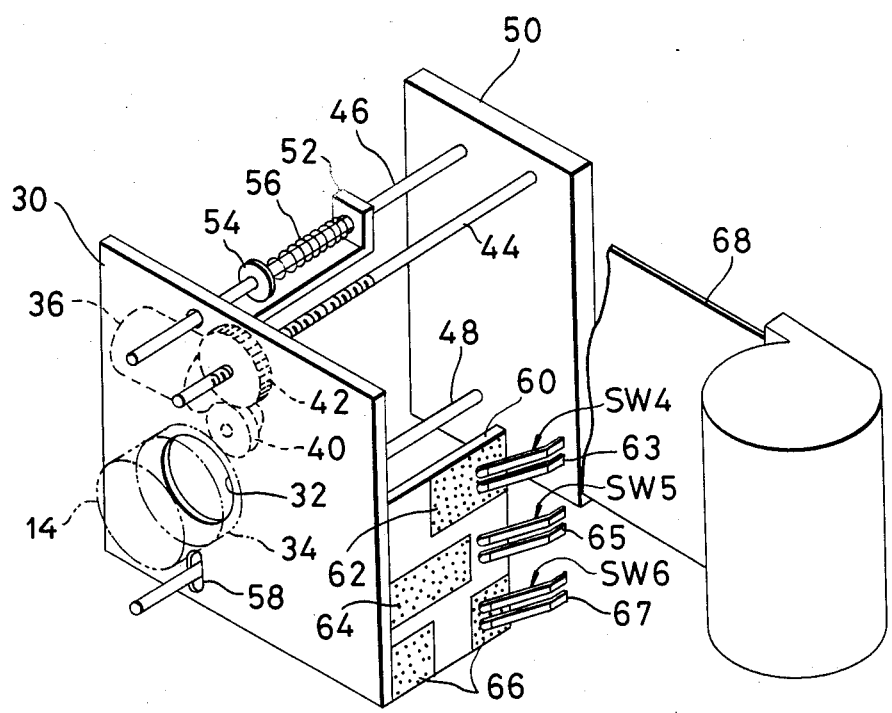
FIG. 5 is a perspective view of the zooming mechanism used in the invention.

A mechanism for moving the lens 14 is shown in FIG. 5.

Referring to FIG. 5, a carriage plate 30 has an opening 32 formed at the middle of the plate through which passes light from the object to be photographed. On the front side surface of the carriage plate there are mounted a diaphragm shutter device 34 and the taking lens 14 in alignment with the opening 32, as shown in phantom. On the backside surface of the carriage plate there is mounted a motor 36 at the upper part of the plate. The rotation axis of the motor extends parallel with the carriage plate and a bevel gear 38 (FIG. 6) fixed at the fore end of the motor shaft. The bevel gear 38 is in mesh with a bevel gear 40 supported by the carriage plate. The bevel gear 40 has a spur gear portion in mesh with a gear 42 which is also supported by the plate 30. The gear 42 has a central through-hole in which a female thread is formed with its axis being on the rotation axis of the gear 42. The internal thread of the gear 42 is in engagement with an external thread of a guide rod 44 passing through the central through-hole of the gear 42. The guide rod 44 extends in the direction along the optical axis. The rear end of the guide rod 44 is fixed to a base plate 50 of the camera body. The forward end of the guide rod loosely passes through a through-hole of the plate 30. Also, extending from the base plate 50 of the camera body in the direction along the optical axis are guide rods 46 and 48 of which the guide rod 48 loosely passes through an elongate slot 58 of the plate 30. The other guide rod 46 loosely passed through at first a through-hole of an arm 52 projected rearwards from the backside surface of the plate 30 and then a through-hole of the plate. The guide rod 46 has a collar 54 formed at the middle of the rod. A spring 56 is disposed between the collar 54 and the arm 52. The function of the spring 56 is to remove any back-lash produced at the thread-engagement portion between the gear 42 and the guide rod 44.

With the above construction, when the motor 36 is started to rotate, the carriage plate 30 carrying thereon the taking lens 14 and the diaphragm shutter device 34 is moved along the three guide rods 44, 46, 48 in the direction of optical axis between the drawn-out position and the drawn-in position.

The carriage plate 30 has also a print board 60 fixed at the right-hand side edge of the plate. Formed on the print board are three conductive lands 62, 64, 66 to be contacted with slide contacts 63, 65, 67 on the camera body, respectively. The conductive land 62 and the slide contact 63 cooperate to form a switch SW4. The conductive land 64 and the slide contact 65 form a switch SW5 and the conductive land 66 and the slide contact 67 form a switch SW6. The switch SW4 is OFF (opened) when the lens 14 is in its drawn-in position. The switch SW5 is OFF when the lens is in the drawn-out position. The switch SW6 is OFF when the lens 14 is in the mid-position between the drawn-in and drawn-out positions. The switches SW4 and SW5 serve as limit switches to cut off the feed of power to the motor 36 when the lens 14 reaches the drawn-in position or the drawn-out position. In the mid-position, the taking lens 14 is not able to form an image of object on the film plane and therefore the shutter release must be prohibited in this case. The swtich SW6 is used to cut off the feed of power to the shutter control circuit in such case. As seen from FIG. 5, a film 68 is between the carriage plate and the base plate.

The above-mentioned auxiliary taking lens and a mechanism for driving the lens will now be described with reference to FIG. 6.

Figure 6:
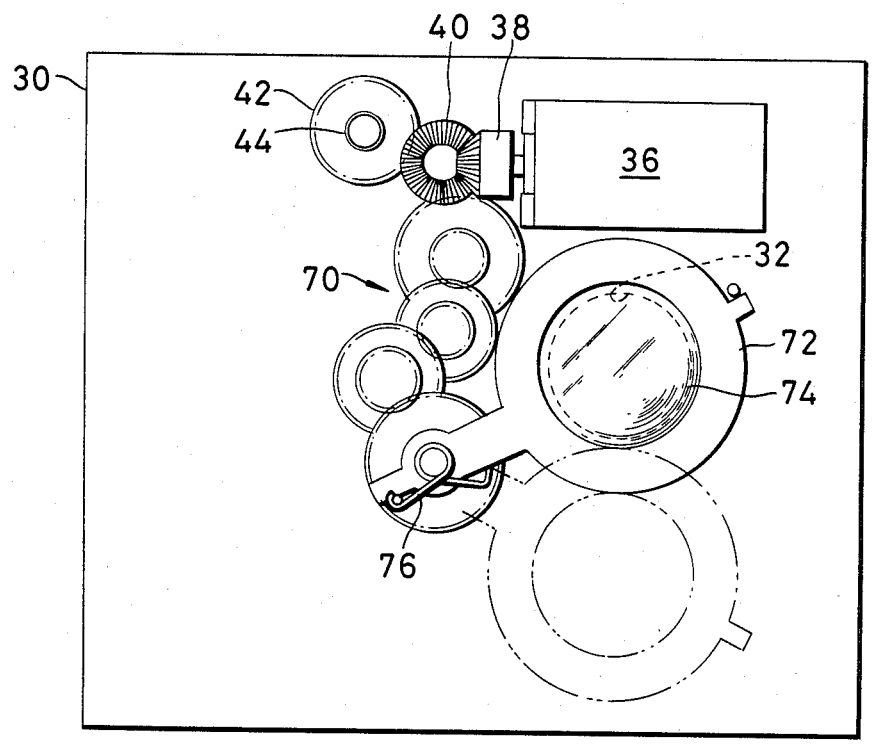
FIG. 6 is a front view of the mechanism for moving an auxiliary lens between working position and non-working position.

As shown in FIG. 6, the carriage plate 30 supports a reduction gear train 70 and a holder 72 arranged on the backside surface of the plate. The holder 72 holds an auxiliary taking lens 74. The input gear of the reduction gear train 70 is in mesh with the spur gear portion of the above-mentioned bevel gear 40. The output gear of the gear train and the holder 72 are coaxial and connected with each other through a torsion spring 76.

The reduction ratio of the gear train 70 is so selected that when the lens 14 is in the drawn-out position, the auxiliary lens 74 assumes its working position interposed in the phototaking optical path and that when the lens 14 is moved back to the drawn-in position, the auxiliary lens 74 is turned to its non-working position retracted from the phototaking optical path. In FIG. 6, the working position of the auxiliary lens 74 is indicated by solid line and the non-working position by phantom line.

As previously mentioned, the auxiliary lens 74 and the lens 14 in the drawn-out position constitute together a composite optical system having a focal length of in the telephoto range.

Figure 7:
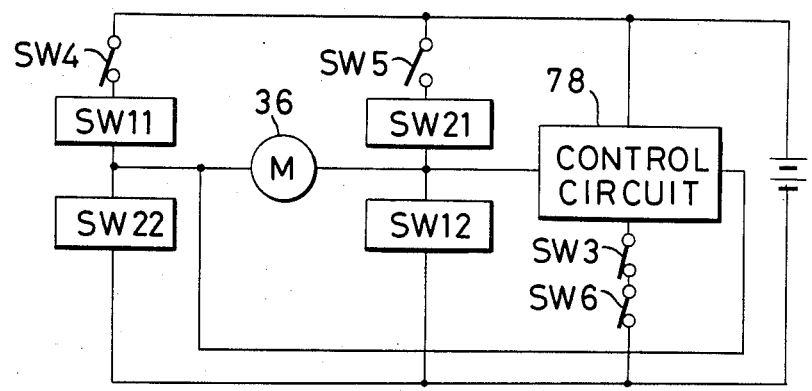
FIG. 7 is a circuit diagram showing the motor control apparatus used in the invention.

FIG. 7 shows an electric circuit for controlling the motor 36.

In FIG. 7, the feed of power to the motor 36 can be effected through three different routes selectively.

The first route is: the positive pole of the power source→switch SW4→switch SW11→the motor 36→switch SW12→the negative pole of the power source. When the power is supplied through this first route, the motor 36 rotates forwardly to move the lens 14 to the draw-in position and also to bring the auxiliary lens 74 to the non-working position.

The second route is: the positive pole of the power source→switch SW5→switch SW21→the motor 36→switch SW22→the negative pole of the power source. When the power is supplied through this second route, the motor 36 rotates reversely to move the lens 14 to the drawn-out position and also to bring the auxiliary lens 74 to the working position.

The switches SW11 and 12 are semiconductor switches controlled by the switch SW1 and switched in the same phase as that of the switch SW1. The switches SW21 and SW22 are semiconductor switches controlled by the switch SW2 and switched in the same phase as that of the switch SW2.

The third route is that connecting the motor to the control circuit 78 for automatic focusing and shutter control. The output of the control circuit 78 causes the motor to rotate forwardly or backwardly to move the taking optical system forwardly or backwardly along the optical axis for focusing.

Serially connected switches SW3 and SW6 are interposed in the power supply line to the control circuit 78. The switch SW3 is OFF (opened) when the dust cover 12 is in the mid-position between the second open position and the close position and also when the cover 12 is in the close position. The switch SW6 is OFF when the lens 14 is in the mid-position between the drawn-out position and the drawn-in position (the auxiliary lens 74 is then in the mid-position between the non-working position and the working position). Therefore, the shutter release is prohibited when the lenses 14, 74 and/or the cover 12 are in positions not suitable for taking a picture.

The manner of operation of the above embodiment will hereinafter be described with reference to the following table, TABLE 1, which shows the relations among the position of cover 12, the focal length of the lens 14, 74 and the positions of switches. The sequence of phases in the table is that as obtained when the cover 12 is moved at first from the first open position shown in FIG. 1 to the close position shown in FIG. 3 and then moved back from the close position to the first open position.

TABLE 1

| phase | the position of cover | the focal length of lens | SW11 SW12 | SW21 SW22 | SW3 | SW4 | SW5 | SW6 |
|---|---|---|---|---|---|---|---|---|
| 1 | 1. open | telephoto | OFF | ON | ON | ON | OFF | ON |
| 2 | mid. | indefinite | ON | OFF | ON | ON | ON | OFF |
| 3 | 2. open | wide angle | ON | OFF | ON | OFF | ON | ON |
| 4 | mid. | wide angle | ON | OFF | OFF | OFF | ON | ON |
| 5 | close | wide angle | ON | OFF | OFF | OFF | ON | ON |
| 6 | mid. | wide angle | ON | OFF | OFF | OFF | ON | ON |
| 7 | 2. open | wide angle | ON | OFF | ON | OFF | ON | ON |
| 8 | 1. open | indefinite | OFF | ON | ON | ON | ON | OFF |
| 9 | 1. open | telephoto | OFF | ON | ON | ON | OFF | ON |

Phase 1

The cover is in the first open position. In this position, shown in FIG. 1, the switch SW1 is OFF and SW2 is ON. The switches SW11 and SW12 of the same phase as that of SW1 are also OFF. Switches SW21 and SW22 of the same phase as that of SW2 are ON. The switch SW3 is ON. The lens 14 is in the drawn-out position and therefore, as seen from FIG. 5, switches SW4, SW5 and SW6 are ON, OFF and ON respectively. The first route described above is not formed. Because of SW5 being OFF, the second route is not formed either. The lens 14 is held in the drawn-out position and the auxiliary lens 74 is held in the working position. Consequently, there is formed a composite optical system having a focal length in telephoto range. Since both of SW3 and SW6 are ON, the control circuit 78 is under operation. Therefore, the camera is in the position to perform picture-taking through the telephoto optical system.

Phase 2

The cover 12 is in a mid-position between the first and second open positions. The slide pin 18 shown in FIG. 4 is pushed down (moved upwardly on the drawing of FIG. 4) by the cover so that the switch SW1 is closed and switch SW2 is opened. Accordingly, switches 11 and 12 are also closed (ON) and switches SW21 and SW22 are opened (OFF). The switch SW4 remains closed (ON). Thereby the first power supply route is formed to start the motor. The lens 14 is moved toward the drawn-in position from the drawn-out position and the auxiliary lens 74 is moved toward the non-working position. The focal length is indefinite in this phase because both of the lenses 14 and 74 are in the middle of movement. Since the lens 14 is in a mid-position between the drawn-out position and the drawn-in position, the switch SW6 is opened (OFF). The control circuit 78 becomes inactive. The camera is disabled from taking a picture.

Phase 3

The cover 12 reaches the second open position, which does not change the state of the switches SW1 and SW2. They remain in the same position as in the above Phase 2. However, when the lens 14 reaches the drawn-in position, switches SW4, SW5 and SW6 take the positions of OFF, ON and ON respectively. Because of SW4 being OFF, the first route is cut off to stop the feed of power to the motor. The lens 14 is stopped at its drawn-in position and the auxiliary lens 74 at its non-working position. As a result, the focal length is changed to wide angle. Since both of SW3 and SW6 are ON, the control circuit 78 is under operation. Therefore, in this phase, the camera is in the position to perform picture taking with the wide angle optical system.

Phase 4

The cover 12 is in a mid-position between the second open position and the close position. The switches SW1 and SW2 remain in the same state as in Phases 2 and 3. Therefore, the lens 14 remains in the drawn-in position and the auxiliary lens 74 in the non-working position. The switch SW3 is opened (OFF) which renders the control circuit 78 inactive. The camera is disabled from taking a picture.

Phase 5

The state of the elements remain unchanged from that in the above Phase 4 except that the cover 12 reaches the close position.

Phase 6

This phase corresponds to Phase 4.

Phase 7

This phase corresponds to Phase 3.

Phase 8

The cover 12 reaches the first open position. As shown in FIG. 1, the slide pin 18 is released from the pressure by the cover. Therefore, the pin 18 is pushed back to its starting position by the biasing force of the spring 22. Thereby the switches SW1 and SW2 are turned to OFF and ON respectively. The switches SW5 remains closed (ON). Therefore, the second power supply route is formed to rotate the motor reversely. The lens 14 is moved toward the drawn-out position from the drawn-in position. At the same time, the auxiliary lens 74 is moved toward the working position. Since the lenses 14 and 74 are in mid-way to the above positions, the focal length is indefinite. At the middle of this movement of the lens 14, the switch SW6 is opened (OFF), which renders the control circuit 78 inactive. Therefore, the camera is disabled from taking a picture.

Phase 9

This phase corresponds to Phase 1.

In the above embodiment, a further reduction of size of the camera may be attained by drawing the phototaking optical system further into the camera housing in conjunction with the movement of the dust cover to the close position.

A second embodiment of the invention is shown in FIGS. 8 through 13.

In this second embodiment, the camera is additionally provided with a particular operation means to be used solely for moving the lens and the dust cover. Other parts of the second embodiment substantially correspond to those of the above first embodiment. In FIGS. 8 to 13, like reference characters to FIGS. 1 to 7 represent the same or corresponding elements of which no further description will be made hereinafter.

Figure 8:
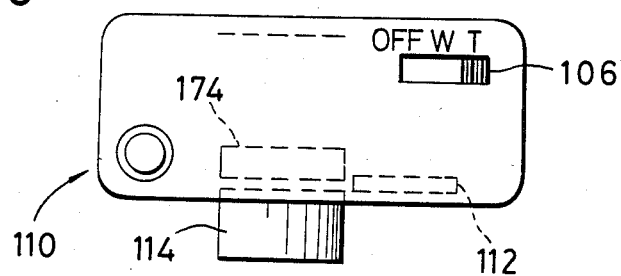
Figure 9:
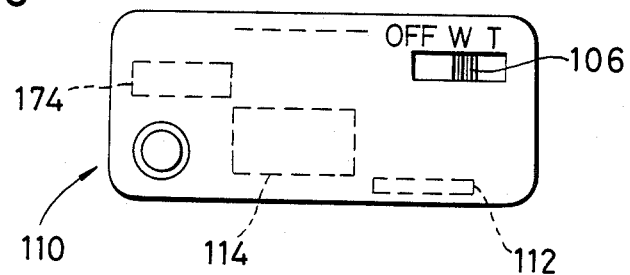
Figure 10:
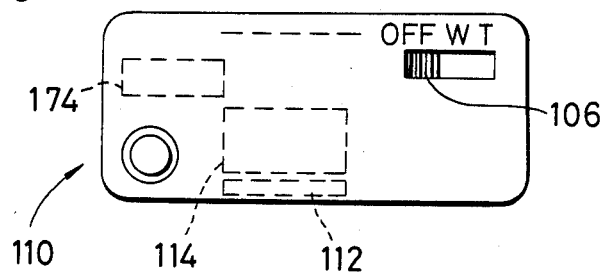

Referring to FIGS. 8, 9 and 10, the camera 110 is provided with a slide knob 106 on the top surface of the camera housing. The slide knob is manually operable and click-stopped at any of three positions, i.e., first, second and third positions which correspond to the first open position, the second open position and the close position of the dust cover in the above first embodiment respectively. Designated by 112 is a dust cover interlocked with the knob 106. The dust cover 112 can be moved between the open position for uncovering the lens 114 and the close position for covering the lens.

In FIG. 8, the knob 106 is in the first position and the dust cover 112 is in the open position. The lens 114 is in the position drawn out from the housing beyond the front surface of the housing. In this position, an auxiliary lens 174 is in its working position behind the lens 114 so that the lenses 114 and 117 together constitute a composite optical system having a focal length in telephoto range. Therefore, the camera is ready for taking a picture with the telephoto optical system. In this position, the knob 106 points to the mark "T" to indicate that the camera is now for telephoto.

In FIG. 9, the knob 106 is in the second position and the dust cover 112 is in the open position. The lens 114 is within the housing. The auxiliary lens 174 is in its non-working position retracted from the phototaking optical path. The focal length of the lens 114 is in the range of wide angle (standard range). Therefore, the camera is in the position to perform picture taking with the wide angle optical system. The knob 106 points to the mark "W" on the housing to indicate that the camera is now for wide angle.

In FIG. 10, the knob 106 is in the third position and the cover 112 is in the close position to cover the lens 114 in the drawn-in position. Since the lens is covered with the dust cover 112, no picture-taking is possible, which is indicated by the mark "OFF" which the knob 106 is now pointing to.

Figure 11:
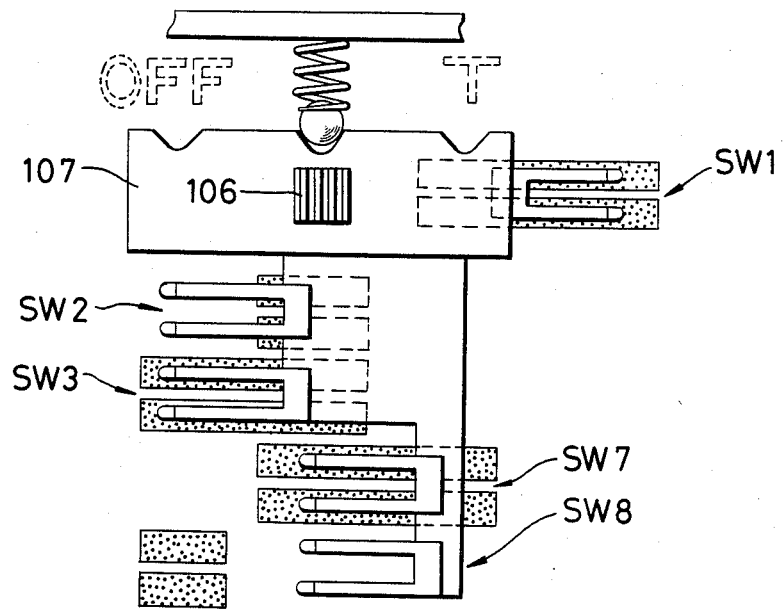
FIG. 11 is a plan view showing the arrangement of switches.

Referring to FIG. 11 it is seen that the slide knob 106 is formed as an integral part of a slider 107. The slider 107 has a group of contacts fixed thereon. These contacts are so arranged that they can contact corresponding conductive lands to form together a group of switches.

Of these switches the switch SW1 is opened (OFF) when the knob 106 is in the first position. The second switch SW2 is opened and closed in the opposite phase to that of the first switch SW1. As previously described, the switches SW1 and SW2 control the rotational direction of the motor for driving the lens 114.

The third switch SW3 is opened when the knob 106 is moved toward the third position from the second one. The opening of SW3 cuts off the feed of power to the control circuit 78 (FIG. 7) to prohibit the shutter release.

In this embodiment, further two switches SW7 and SW8 are provided to control the opening and closing of the dust cover. The switch SW7 is closed when the knob 106 is in the first and second positions, and it is opened when the knob 106 is in the third position. The switch SW8 is a switch whose phase is opposite to the switch SW7.

The lenses 114 and 117 are driven by the same mechanism as previously shown in FIGS. 5 and 6 and therefore the lens driving mechanism need not be further described.

Figure 12:
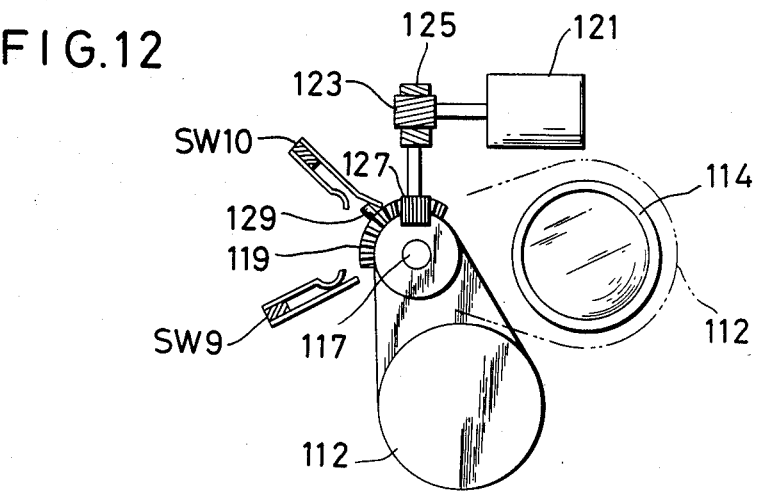
FIG. 12 is a front view of the mechanism for closing and opening the dust cover.

The mechanism for opening and closing the dust cover 112 will be described with reference to FIG. 12.

On the inside surface of the front wall of the camera housing, the cover 112 is pivotally supported by a shaft 117 extending parallel with the optical axis. Partly surrounding the shaft 117 is a face wheel 119. The face wheel is in mesh with a gear 127. The rotation of a motor 121 is transmitted to the gear 127 through a worm wheel 123 and a worm gear 125. Then, the gear 127 moves the cover 112 pivotally about the shaft 117 through the face wheel 119. When the cover 112 reaches the close position suggested by the phantom line from the open position indicated by the solid line, a pin 129 opens a limit switch SW9 to stop the rotation of the motor 121. Similarly, when the cover reaches the open position from the close position, the pin 129 opens another limit switch SW10 to stop the motor.

Figure 13:
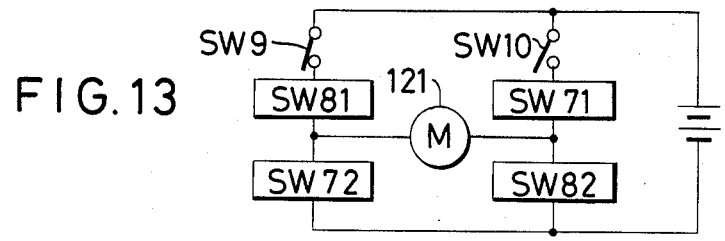
FIG. 13 is a circuit diagram of the motor control apparatus.

FIG. 13 shows a motor control circuit for opening and closing the dust cover 112.

In the control circuit shown in FIG. 13, the motor 121 can be driven through a first power supply route or a second power supply route selectively.

The first route is: the positive pole of the power source→switch SW9→switch SW81→the motor→switch SW82→the negative pole of the power source. When the power is supplied to the motor through this first route, the motor rotates in the direction to move the cover 121 to the close position from the open position.

The second route is: the positive pole of the power source→switch SW10→switch SW71→the motor→ switch SW72→the negative pole of the power source. When the power is supplied to the motor through the second route, the motor rotates reversely to move the cover 121 to the open position from the close position.

The switches SW71 and SW72 are semiconductor switches controlled by the above-mentioned switch SW7, and they are closed and opened in the same phase as that of SW7. The switches SW81 and 82 are semiconductor switches controlled by the switch SW8 and they are closed and opened in the same phase as that of SW8.

FIGS. 14 through 17 show a third embodiment of the invention. In this embodiment, the operation of drawing the taking lens out or back is possible only when the dust cover is open. So long as the cover is in the close position for covering the lens, the lens remains fixed to the drawn-back position even when the knob is operated.

Figure 14:
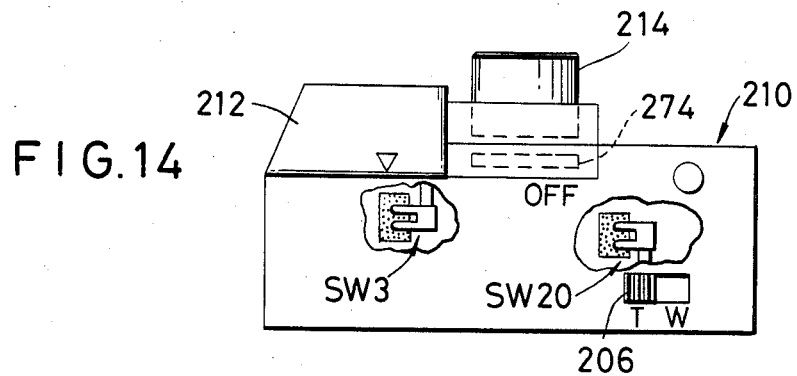
Figure 15:
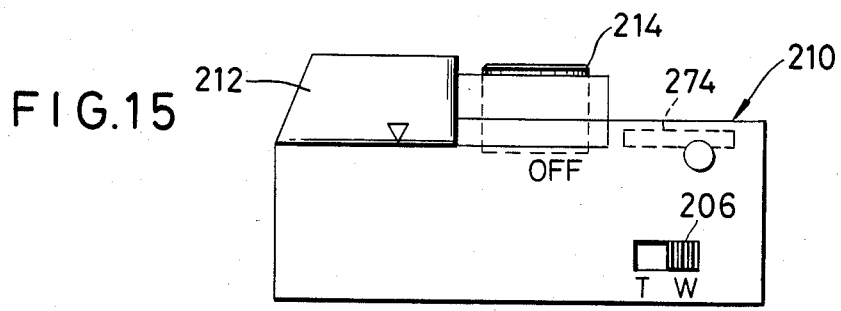
Figure 16:
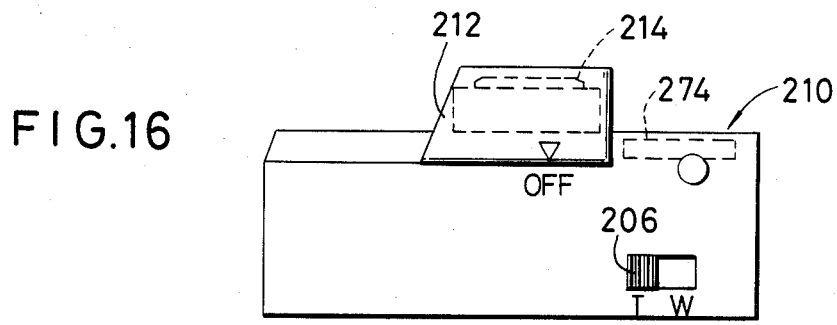

Referring to FIGS. 14 to 16, an operation knob 206 is provided on the top surface of the housing of the camera 210. The operation knob 206 is manually operable at any time to change the focal length.

In FIG. 14 the cover 212 is shown to be in the open position. The operation knob 206 is in the position opposed to the mark "T" to select the focal length for telephoto. The lens 214 is in the position drawn out forward further than the front surface of the cover 212. In this position, like the first embodiment, the auxiliary lens 274 is in the working position interposed in the phototaking optical path so that the lenses 214 and 274 together form a composite optical system the focal length of which is in telephoto range.

The cover 212 has an electric contact fixed thereto which cooperates with a conductive land fixed on the camera body to form a switch SW3. The switch SW3 corresponds to SW3 of the circuit shown in FIG. 7. It is closed when the cover 212 is in the open position and it is opened with the movement of the cover from the open position to the close position.

The operation knob 206 has an electric contact fixed thereto which cooperates with a conductive land on the camera body to form a switch SW20. The switch SW20 is closed when the knob 206 is in the position for telephoto and it is opened when the knob is in the position for wide angle.

The camera 210 further includes a driving mechanism and an electric circuit as previously shown in FIGS. 5 to 7. In this third embodiment, the semiconductor switches SW11, SW12, SW21 and SW22 in the electric circuit as shown in FIG. 7 are controlled by a logic circuit 240 as shown in FIG. 17.

Referring to FIG. 17, the logic circuit 240 has a pair of input terminals 241, 242 and a pair of output terminals 243, 244. The input terminal 241 is connected between a switch SW31 and a grounded resistor. The switch SW31 is closed and opened in the same phase as that of the above-mentioned switch SW3. The other input terminal 242 is connected between the above-mentioned switch SW20 and a grounded resistor. The output terminal 243 is connected to the control terminals of the semiconductor switches SW11 and SW12 shown in FIG. 7. The other output terminal 244 is connected to the control terminals of the semiconductor switches SW21 and SW22. When the switch SW31 is ON (closed), that is, when the cover 212 is in the open position, the level at the input terminal 241 becomes high and when the switch SW31 is OFF (opened), that is, when the cover is in the close position, the level is low. The level at the input terminal 212 becomes high when the switch SW20 is ON, that is, when the knob 206 is in the position for telephoto and it becomes low when SW20 is OFF, that is, when the knob 206 is in the position for wide angle. The output from the output terminal 243 closes both of switches SW11 and SW12 by high level signal and opens them by low level signal. The output from the other output terminal 244 closes both of SW21 and SW22 by high level signal and opens them by low level signal.

The input terminal 241 of the logic circuit 240 is connected to one input terminal of an exclusive OR-gate 245 and one input terminal of NOR-gate 246. The input terminal 242 of the logic circuit is connected to another input terminal of the exclusive OR-gate 245 and another input terminal of the NOR-gate 246. The output terminals of the gates 245 and 246 are connected to the input terminals of OR-gate 247 respectively. The output terminal of the OR-gate 247 is connected to the output terminal 243 and also to the output terminal 244 through an inverter 248.

In the position shown in FIG. 14 in which both of the switches SW3 and SW20 are closed (ON), the two input terminals of the logic circuit 240 are both at high level. The outputs of the exclusive OR-gate 245 and NOR-gate 246 are at low level, and the output of OR-gate 247 is also at low level. Accordingly, the output from the terminal 243 of the logic circuit 240 is at low level and the output from the terminal 244 is at high level. Thereby, the switches SW11 and SW12 in FIG. 7 are opened whereas SW21 and SW22 are closed. Since the lens 214 is in the drawn-out position at the time, the switches SW4, SW5 and SW6, as shown in FIG. 5, ON, OFF and ON respectively. Consequently, there is formed no circuit for supplying power to the motor. The lens 214 and the auxiliary lens 274 remain still at their respective positions.

When the operation knob 206 is shifted to the position for wide angle, the switch SW20 is closed and the signal level at the input terminal 242 of the logic circuit 240 becomes low. The output of the exclusive OR-gate 245 becomes high and the level at the output terminal of the OR-gate 247 is inverted to high level. The output from the terminal 243 of the logic circuit changes to high level and that from the output terminal 244 to low level. Thereby, the switches SW11 and SW12 in FIG. 7 are closed and the switches SW21 and SW22 are opened. Since the lens 214 is in the drawn-out position at the time, the switches SW4, SW5 and SW6 are, as shown in FIG. 5, ON, OFF and ON respectively. Therefore, the power is supplied to the motor through switches SW4, SW11 and SW12. The motor starts rotating to move the lens 214 toward the drawn-in position from the drawn-out position and also move the auxiliary lens 274 toward the non-working position. When the switch SW4 is opened, the motor stops rotation. FIG. 15 shows the camera in this state.

If the dust cover 212 is moved toward the close position from the open position in FIG. 14 or FIG. 15, then the switch SW3 is opened at the first step of the cover movement. The opening of SW3 renders low the level at the input terminal 241 of the logic circuit. The output of the exclusive OR-gate changes to high level. Accordingly, the output terminal 243 of the logic circuit has a high level signal and the output terminal 244 has a low level signal. Therefore, the lens 214 is stabilized at the drawn-in position and the auxiliary lens 274 is fixed at the non-working position irrespective of the position of the operation knob 206. It is therefore possible to move the cover up to the close position in which the lens 214 is covered with the dust cover 212 as shown in FIG. 16.

While the invention has been particularly shown and described with reference to preferred embodiments thereof, it will be understood by those skilled in the art that various changes and modifications may be made therein without departing from the spirit and scope of the invention.

I claim:

1. A camera comprising:
   (a) picture-taking means, including a phototaking optical system, functioning to enable said camera to take a picture of an object;
   (b) means acting on said optical system to change an optical property of said optical system between a first property and a second property different from said first property;
   (c) means for disabling said picture-taking means to prevent said camera from taking a picture;
   (d) operating means including an operation member manually settable to a plural number of operation positions, selectively, including first, second and third operation positions; and
   (e) means for controlling said acting means and said disabling means in response to said operating means, said control means controlling said acting means in such manner that the optical property of said optical system is changed to said first property by a manual setting of said operation member into said first operation position and said optical property is changed to said second property by a manual setting of said operation member into said second operation position, and controlling said disabling means in such a manner that said disabling means is actuated by a manual setting of said operation member into said third operation position.

2. A camera according to claim 1, wherein said camera has a housing and said disabling means includes a cover member for encasing said optical system within said housing with said optical system being covered against the exterior.

3. A camera according to claim 1, wherein said camera has a housing, wherein said acting means, when said optical property is to be changed over to said first property, moves said optical system along the optical axis up to a position in which at least a part of said optical system projects forward from said housing, and wherein said acting means, when said optical property is changed over to said second property, moves said optical system back to another position in which said optical system is retracted into said housing.

4. A camera according to claim 3, wherein said control means holds said optical system in the position retracted into said housing whenever said operation member is manually set in said third operation position and wherein said disabling means includes means for covering said optical system.

5. A camera according to claim 1, wherein said camera has shutter means for starting an exposure operation in response to a releasing operation and said disabling means includes means for prohibiting the operation of said shutter means.

6. A camera according to claim 1, wherein said operating means includes a cover member for covering said optical system, wherein at the first operation position of said operating means, said cover member is at a first open position in which said cover member permits said optical system be exposed to the exterior, wherein at the second operation position, said cover member is at a second open position in which said cover member permits said optical system be exposed to the exterior, and wherein at the third operation position, said cover member is at a closed position in which said cover member covers said optical system from the exterior.

7. A camera comprising:
   (a) picture-taking means, including a phototaking optical system, functioning to enable said camera to take a picture of an object;
   (b) means acting on said optical system to change the focal length of said optical system between a first focal length and a second focal length shorter than said first focal length;
   (c) means for covering said optical system;
   (d) operating means including an operation member manually settably to a plural number of operation positions, selectively, including first, second and third operation positions; and
   (e) means for controlling said acting means in response to said operating means, said control means controlling said acting means in such manner that the focal length of said optical system is changed to said first focal length on manual setting of said operation member into said first operation position and that said focal length is changed to said second focal length on manual setting of said operation member into said second operation position, said covering means being effective to cover said optical system on manual setting of said operation member into said third operation position.

8. A camera according to claim 7, wherein said camera has a housing, wherein said acting means, when the focal length is to be changed to said first focal length, moves said optical system along the optical axis up to a position in which at least a part of said optical system projects forward from said housing, and wherein said acting means, when the focal length is to be changed to said second focal length, moves said optical system back to another position in which said optical system is retracted into said housing.

9. A camera according to claim 8, wherein said control means, in response to manual setting of said operation member into said third operation position, actuates said cover means to cover said optical system.

10. A camera comprising:
(a) a housing;
(b) an optical system having a phototaking optical path and being movable along said path between a drawn-out position in which at least a part of said optical system projects forward from said housing, and a drawn-in position retracted from said drawn-out position;
(c) driving means, including manually operable means positionable for selecting the drawn-out position or the drawn-in position for said optical system, said driving means moving said optical system to the position selected by said manually operable means; and
(d) means for controlling said driving means independently of the position of said manually operable means and settable for causing said drive means to retain said optical system in said drawn-in position irrespective of the position of said manually operable means, thereby rendering positioning of said manually operable means ineffective to control said drive means.

11. A camera according to claim 10, further comprising cover means provided on said housing and movable between a closed position across said optical path and an open position away from said optical path, said controlling means being operative when said cover means is moved from said open position to said closed position.

12. A camera according to claim 10, wherein said driving means includes an electric motor, mechanical means coupled to said motor for moving said optical system on operation of said electric motor, and circuit means for supplying electric power to said electric motor in response to said operating means.

13. A camera according to claim 12, wherein said control means includes manually operated switch means and means for enabling said circuit means in response to said switch means.

14. A camera according to claim 10, wherein when said optical system is in said draw-out position, it has a first focal length and when said optical system is in said drawn-in position, it has a second focal length shorter than said first focal length.

* * * * *